Figure 1:
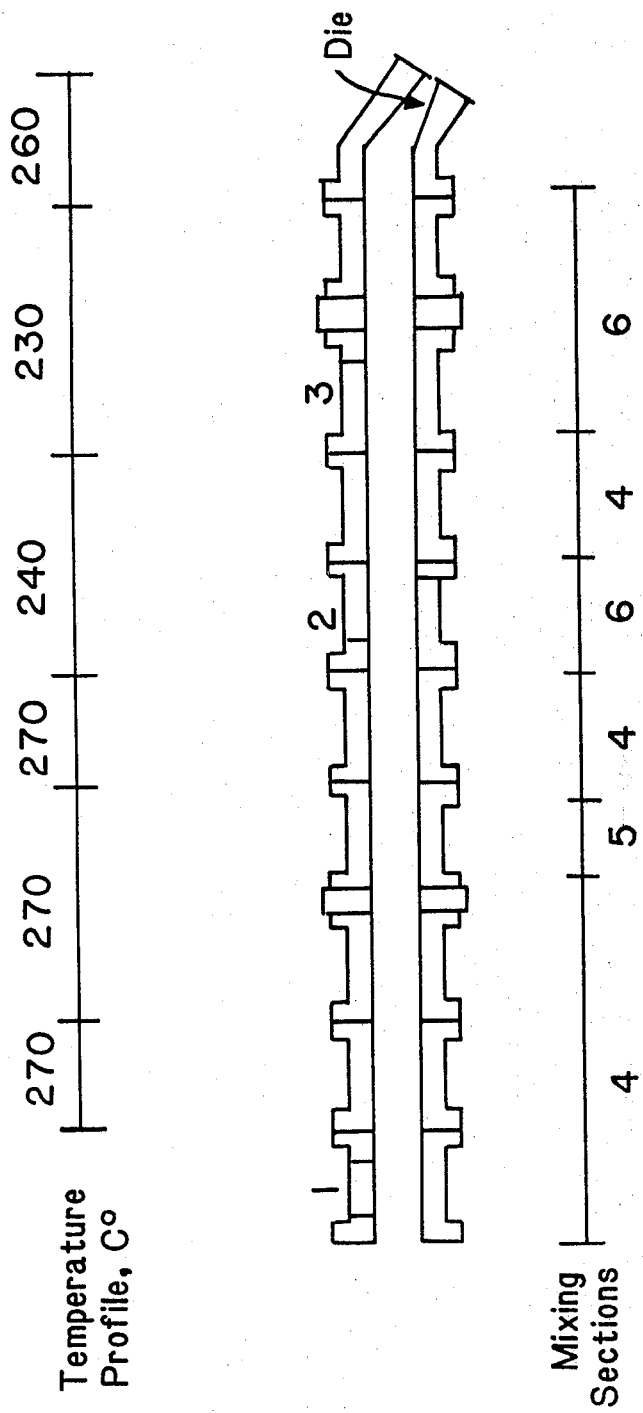

United States Patent [19]

Phillips et al.

[11] Patent Number: 4,466,912
[45] Date of Patent: Aug. 21, 1984

[54] CONDUCTIVE THERMOPLASTIC COMPOSITIONS

[75] Inventors: Walter J. Phillips, McDonald, Pa.; Herbert L. Rawlings, New Martinsville, W. Va.

[73] Assignee: Mobay Chemical Corporation, Pittsburgh, Pa.

[21] Appl. No.: 429,914

[22] Filed: Sep. 30, 1982

[51] Int. Cl.$^3$ .............................................. H01B 1/02
[52] U.S. Cl. ..................... 252/512; 252/518; 524/430; 524/441; 524/439; 523/137
[58] Field of Search ................... 525/67; 252/512, 511, 252/518; 524/441, 439, 430, 504, 501; 523/137

[56] References Cited

U.S. PATENT DOCUMENTS

| 3,130,177 | 4/1964 | Grabowski | 525/67 |
| 3,852,393 | 12/1974 | Furukawa et al. | 525/67 |
| 3,935,157 | 1/1976 | Schiller et al. | 260/37 PC |
| 4,098,734 | 7/1978 | Lee | 525/67 |
| 4,367,310 | 1/1983 | Henton | 525/67 |

FOREIGN PATENT DOCUMENTS

| 882633 | 7/1980 | Belgium . |
| 0077059 | 4/1983 | European Pat. Off. . |
| 48-12411 | 4/1973 | Japan . |
| 54-160466 | 12/1979 | Japan . |
| 55-120637 | 9/1980 | Japan . |
| 57-065751 | 4/1982 | Japan . |
| 57-85991 | 5/1982 | Japan . |
| 57-85992 | 5/1982 | Japan . |
| 57-85993 | 5/1982 | Japan . |
| 57-85994 | 5/1982 | Japan . |
| 1030335 | 5/1966 | United Kingdom . |
| 1069752 | 5/1967 | United Kingdom . |

OTHER PUBLICATIONS

"Sales Brochure by Trivalent Materials Group", Scientific Advances, Inc., *Transment for Conductive Composites*.

"Polycarbonates", by William F. Christopher and Daniel W. Fox, pp. 151-152.

*Primary Examiner*—Joseph L. Barr
*Attorney, Agent, or Firm*—Gene Harsh; Lawrence S. Pope; Aron Preis

[57] ABSTRACT

Thermoplastic compositions comprising a polycarbonate resin, a graft copolymer and conductive particles are provided suitable for the preparation of molded articles characterized in that they provide an improved level of EMI shielding.

4 Claims, 2 Drawing Figures

CONDUCTIVE THERMOPLASTIC COMPOSITIONS

FIELD OF THE INVENTION

The present invention relates to a conductive polymeric composition and, more specifically, to polycarbonate/graft copolymer compositions containing conductive particles.

SUMMARY OF THE INVENTION

Thermoplastic compositions comprising a polycarbonate resin, a graft copolymer and conductive particles are provided suitable for the preparation of molded articles characterized in that they provide an improved level of EMI shielding.

BACKGROUND OF THE INVENTION

Compositions comprising blends of a polycarbonate resin and an ABS resin were disclosed in U.S. Pat. Nos. 3,130,177 and 3,852,393. The usefulness of these compositions has been sometimes limited due in part to the fact that they, like other polymeric compositions, are not protective in respect to electro-magnetic interference (EMI). EMI is caused by electromagnetic radiation from electronic and electric devices and disrupts the operation of business equipment and instrumentation generally. The use of plastics in fabricating enclosures for such equipment and instrumentations is quite wide spread primarily because of the cost advantage they represent in comparison to other materials. Plastics, however, are transparent to EMI except where conductive materials have been incorporated therewith. The art is noted to include reports where conductive particles of the type used in the present invention have been successfully introduced in polycarbonates and in polyester resins in amounts of up to 20% by weight. (see sales brochure by the Trivalent Materials Group, Scientific Advances, Inc., A subsidiary of Battelle Memorial Institute of Columbus, Ohio)

GRAFT COPOLYMERS

In the context of the present practice, graft copolymers are ABS (acrylonitrile-butadiene-styrene) resins prepared by either bulk or mass suspension polymerization as distinguished from similar resins prepared by emulsion polymerization. In terms of particle size distribution, the suitable ABS resins of the invention range from about 0.2 to about 10 microns preferably 0.2 to about 5 microns.

Essentially, the molecules of ABS graft polymers consist of two or more polymeric parts of different compositions chemically united. The graft polymers may be prepared by polymerizing at least one conjugated diene, such as butadiene or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

A specific conjugated diene monomer which may be utilized in preparing the backbone of the graft polymer is generically described by the formula:

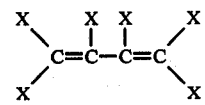

wherein X may be selected from the group consisting of hydrogen, alkyl groups containing from one to five carbon atoms, chloro and bromo. Examples of dienes that may be used are butadiene; isoprene; 1,2-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro- and bromo-substituted butadienes such as dichlorobutadiene, bromobutadiene, chloroprene, dibromobutadiene, mixtures thereof and the like. The preferred conjugated diene utilized herein is butadiene.

The first monomer or group of monomers polymerized in the presence of the prepolymerized backbone are preferably monovinyl aromatic hydrocarbons. The monovinyl aromatic monomers utilized are generically described by the formula:

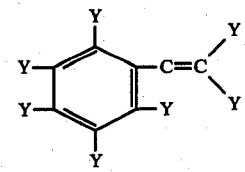

wherein Y may be selected from the group consisting of hydrogen, alkyl groups containing from 1 to 5 carbon atoms, chloro and bromo. Examples of the monovinyl aromatic compounds and substituted monovinyl aromatic compounds that may be used are styrene and other vinyl-substituted aromatic compounds including alkyl-, cycloalkyl-, aryl-, alkaryl-, aralkyl-, alkoxy-, aryloxy- and other substituted vinyl aromatic compounds. Examples of such compounds are 3-methylstyrene; 3,5-diethylstyrene and 4-n-propylstyrene, α-metylstyrene, α-methylvinyltoluene, α-chlorostyrene, vinyltoluene, α-bromostyrene, chlorophenylethylenes, dibromophenylethylenes, tetrachlorophenylethylenes, dibromophenylethylenes, tetrachlorophenylethylenes, 1-vinylnaphthalene, 2-vinylnaphthalene, mixtures thereof and the like. The preferred monovinyl aromatic hydrocarbon used herein is styrene and/or α-methylstyrene.

The second group of monomers that are polymerized in the presence of the prepolymerized backbone are acrylonitrile, substituted acrylonitrile and/or acrylic acid esters exemplified by acrylonitrile and alkyl acrylates such as methylmethacrylate. The acrylonitrile, substituted acrylonitrile or acrylic acid esters are described generally by the formula:

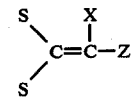

wherein S may be selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples of monomers of this description, i.e., acrylonitrile, substituted acrylonitrile or acrylic acid esters of the above formula are acrylonitrile, ethacrylonitrile, methacrylonitrile, β-chloroacrylonitrile, α-chloroacrylonitrile, β-bromoacrylonitrile and α-bromoacrylonitrile, methylacrylate, methylmethacrylate, ethylacrylate, butylacrylate, propylacrylate, isopropylacrylate, isobutylacrylate, mixtures thereof and the like. The preferred acrylic monomer used herein is acrylonitrile and the preferred acrylic acid esters are ethylacrylate and methylmethacrylate.

In the preparation of the graft polymer, the conjugated diolefin polymer or copolymer exemplified by 1,3-butadiene polymer or copolymer comprises from about 60% by weight to about 5% by weight of the total graft polymer composition and the monomers polymerized in the presence of the backbone exemplified by styrene and acrylonitrile comprise from about 40 to about 95% by weight of the total graft polymer composition.

The second group of grafting monomers, exemplified by acrylonitrile, ethylacrylate or methylmethacrylate of the graft polymer composition, preferably comprise from about 10% to about 40% by weight of the total graft copolymer composition and the monovinyl aromatic hydrocarbon exemplified by styrene preferably comprises from about 30 to about 70% by weight of the total graft polymer composition.

In preparing the graft polymer of this invention, a certain percentage of the polymerizing monomers that are grafted on the backbone will occur as free copolymer. If styrene is utilized as one of the grafting monomers and acrylonitrile as the second grafting monomer, a certain portion of the composition will occur as styrene acrylonitrile copolymer. In certain instances, one of the first group, i.e., monovinyl aromatic monomers such as α-methylstyrene (or other monomer) is copolymerized with one of the second group, i.e., acrylonitrile, substituted acrylonitrile, etc., and a certain percentage of the composition is comprised of, for example, an α-methylstyrene acrylonitrile copolymer (or other copolymer). It is contemplated in this invention that the composition referred to as graft polymer contain up to 90% copolymer existing either as free copolymer from preparation of the graft or as an added copolymer component. These added copolymers are preferably materials having high heat distortion temperatures such as is the case when α-methylstyrene acrylonitrile copolymers are added.

Essentially, the ABS resins of the invention (described more fully in U.S. Pat. No. 3,852,393, the disclosure of which is incorporated herein by reference) can be obtained by dissolving a butadiene type rubber, such as polybutadiene or a butadiene-styrene copolymer, in a mixture of a vinyl cyano compound represented, for example, by acrylonitrile and a vinyl aromatic hydrocarbon (including a halogenated compound) represented by styrene, polymerizing the mixture substantially under bulk polymerization conditions, although a small amount of water can be present in some cases, under sufficiently high agitation so as to shear the rubber being precipitated as polymerization advances until 10 to 40% by weight of the vinyl cyano compound and vinyl aromatic compound are polymerized, and then adding water and a suspension stabilizer to the polymerization system and continuing the polymerization under the suspension polymerization conditions until the polymerization is substantially completed.

In the preferred practice, butadiene-styrene copolymers prepared by the solution polymerization process using an organic metal compound as catalyst is used as the butadiene type rubber. Specifically, rubbers prepared by solution polymerization yield products having better properties (better transparency, less coloration) than rubbers of the emulsion polymerization type.

THE POLYCARBONATE RESIN

The polycarbonate resins useful in the practice of the invention are homopolycarbonates, copolycarbonates and terpolycarbonates or mixtures thereof. The polycarbonates generally have molecular weights of 10,000–200,000 (average molecular weight), preferably 20,000–80,000 and may have a melt flow rate per ASTM D-1238 at 300° C. of about 1 to about 24 gm/10 min., preferably about 2–6 gm/10 min. They may be prepared, for example, by the known diphasic interface process from phosgene and bisphenols by polycondensation (see German Offenlegungsschriften Nos. 2,063,050; 2,063,052; 1,570,703; 2,211,956; 2,211,957 and 2,248,817; French Pat. No. 1,561,518; and the monograph, H. Schnell, "Chemistry and Physics of Polycarbonates", Interscience Publishers, New York, 1964, all incorporated herein by reference).

In the present context, bisphenols suitable for the preparation of the copolycarbonates of the invention conform to the structural formulae (1) or (2)

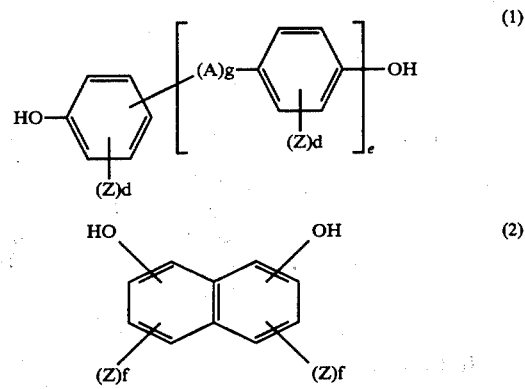

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an —SO— or —SO$_2$— radical;

e and g both denote the number 0 or 1;

Z denotes F, Cl, Br or C$_1$-C$_4$-alkyl and if several Z radicals are substituents in one aryl radical, they may be identical or different;

d denotes 0 or an integer of from 1 to 4 and f denotes 0 or an integer of from 1 to 3.

Among the useful bisphenols in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,365; 2,999,835; 3,148,172;

3,271,368; 2,991,273; 3,271,367; 3,280,078; 3,014,891 and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl-2-methylbutane, 1,1-bis-(3,5-dimethyl-4-hydroxyphenyl)-cyclohexane, α,α-bis-(3,5-dimethyl-4-hydroxyphenyl)-p-diisopropylebenze, 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate copolycarbonates and terpolycarbonates such as are described in U.S. Pat. Nos. 3,036,036 and 4,210,741, both incorporated by reference herein.

The polycarbonates of the invention may also be branched by incorporating small quantities of polyfunctional (preferably polyhydroxy) compounds in them by condensation, e.g., 0.05–2.0 mol % (based on the quantity of bisphenols used). Polycarbonates of this type have been described, for example, in German Offenlegungsschriften Nos. 1,570,533; 2,116,974 and 2,113,347; British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-benzene; 1,1,1-tri-(4-hydroxy-phenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4',4"-dihydroxytriphenylmethyl)-benzene.

Among the other useful polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above and which essential are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,248,414; 3,153,008; 3,215,668; 3,187,065; 2,064,974; 2,070,137; 2,991,273 and 2,000,835.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

CONDUCTIVE PARTICLES

The conductive particles suitable in the context of the present invention are metals, metal oxide or metal alloys all in the form of flakes characterized in that their resistivity (in micro-ohms-centimeter at 20° C.) is below 15, preferably below 10 and in that their largest dimension does not exceed 0.250". Preferably, the flake thickness may average from about 0.0008 to about 0.10", preferably about 0.001" to about 0.005" and while their planar shape is not critical in the present context—square, circular, regular and irregular shapes are all possible—their projected area is preferably between about $9 \times 10^{-4}$ and $4 \times 10^{-3}$ inch$^2$, preferably between $16 \times 10^{-4}$ and $25 \times 10^{-4}$ inch$^2$. Aluminum is the most preferred material and flakes measuring about $0.040 \times 0.050 \times 0.001"$ are the preferred configuration. Aluminum flakes suitable for the purpose are available commercially under the trade name Transmet, from Scientific Advances, Inc., a subsidiary of Battelle Memorial Institute of Columbus, Ohio.

The compounding of the compositions in accordance with the present invention was carried out using a twin screw, intermeshing co-rotating extruder ZSK 53V by Werner Pfleider, screw rpm 105, at a temperature profile as shown in FIG. 1. Certain practices and modifications as described herein below were found to be necessary in order to obtain a homogeneous mixture of resin and aluminum flakes with minimum flake deformation. Since aluminum flakes are characterized both by their low bulk density and by their high thermal conductivity, they tend to float on the surface of the molten resin and cause rapid local freezing of the melt. In order to alleviate the problem, it was found that the flakes best be accurately metered into the homogeneous melt down stream from a high intensity mixing zone. Further, it was found that the flow of the flakes needs to be directed to the area of the screw set which is turning into the extruder body, axial to the screw. The flakes also were directed so as to impinge on only 1 to 1½ flights of the exposed screw as they advanced to re-enter the extruder body. Control of the transverse and axial directions of the flow of the flakes results in that all of the flakes entry was confined to an area within one turn of the screw and was accomplished by using a hopper having a 60° inclined plane positioned parallel to the direction of extrusion (see FIG. 2). In order to eliminate the flotation action of rising volatiles and heated air counter-current to the descending flakes, a slight vacuum was drawn on the space above the exposed screw. It was further found that entry of the flakes into the melt is best carried out at more than one location as shown in FIG. 1. Downstream of the first location of the entry of the flakes, the polymer/flakes mixture was subjected to a medium intensity distributive mixing zone so as to present a homogeneous mixture at the subsequent point of entry of the flakes. Downstream of that subsequent entry point, low intensity mixers were used to avoid, or at least minimize, deformation of the flakes while providing the necessary pressure to form the melt into strands by forcing it through the die. The strands were then cooled and chopped into pellets useful for injection molding or other thermoplastic forming processes.

FIG. 1 is a schematic representation of the extrusion process—side view—indicating the temperature profile, the corresponding mixing zones and the points of entry of the aluminum flakes into the molten resin.

In FIG. 1, is the location of entry of the polycarbonate/graft polymer mixture. 2 and 3 are locations of entry of the conductive particles. The mixing sections along the extruder barrel are numbered 4, 5 and 6 in the figure and denote a medium, high and low intensity mixing section, respectively.

Figure 2:
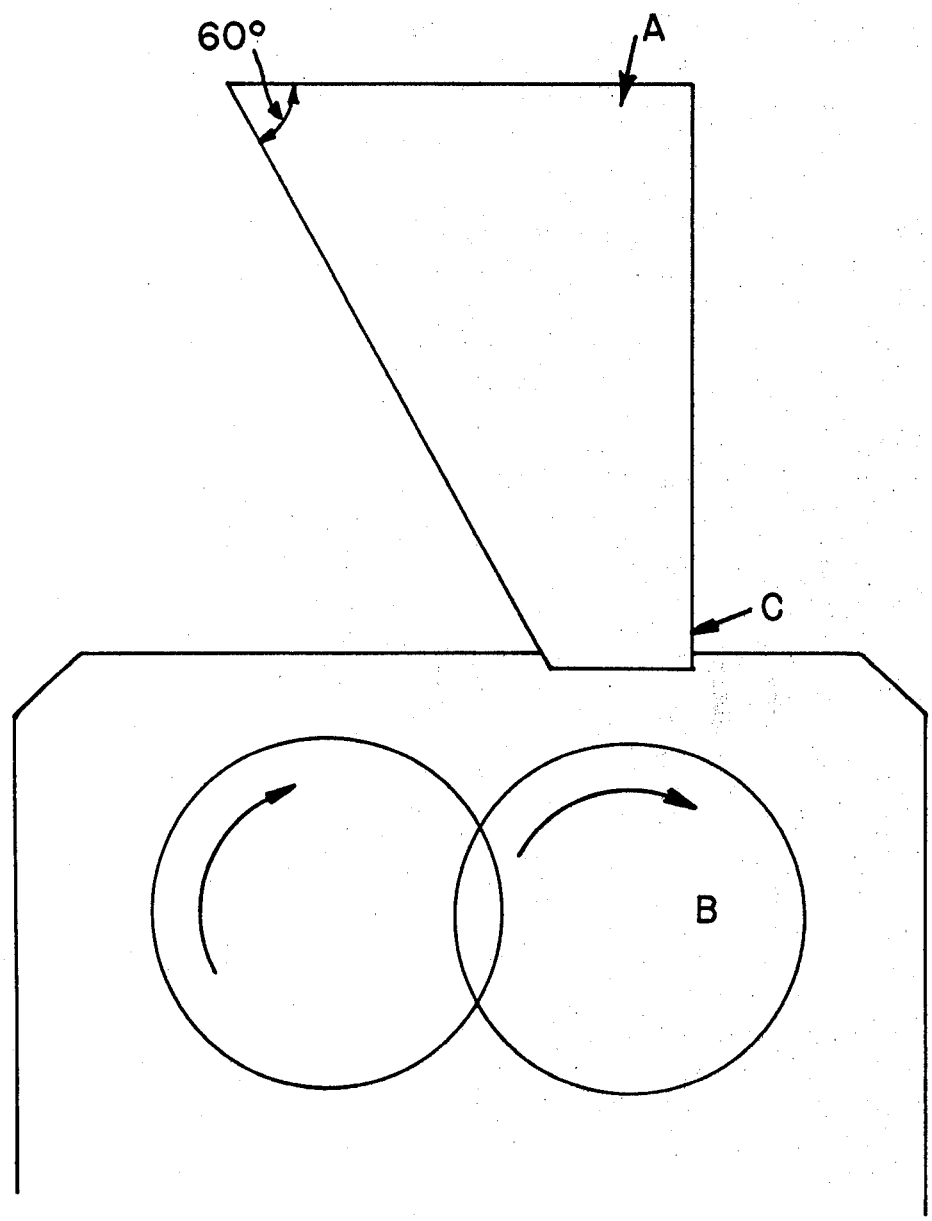

FIG. 2 is a schematic representation of a cross-section of the extruder at the point of entry of the conductive particles. A is a hopper positioned over a screw B and C is a vacuum vent as described above.

In the practice of the invention compositions comprising the resin blend and conductive particles may be prepared as described above. The resin blend may be characterized in that the weight ratio between the polycarbonate resin and the graft copolymer is between about 30/70 and about 70/30, more preferably between about 40/60 and about 60/40. The compositions of the invention may be further characterized in that the amount by volume of the conductive particles may be at least 8%, preferably 10 to 25%, more preferably between about 12 to about 20%, most preferably between about 14 and 18%, all percents being relative to the volume of the blend plus that of the conductive particles.

EXAMPLES

Tables 1 and 2 summarize the properties of the compositions of the invention set in comparison to a control wherein ABS was of the emulsion polymerization type. In the Examples the compositions all contain 40% by weight aluminum flakes (about 14.8 volume %) and the polycarbonate resin was Merlon M-50, a product of Mobay Chemical Corporation, having a melt index per ASTM D-1238 of about 3–5.9 gm/10 min. The graft copolymer was Dow 213, an ABS resin available from Dow Chemical Corporation and the conductive particles were aluminum flakes available commercially as Transmet K-162 and K-102HE from Scientific Advances, Inc., Columbus, Ohio. Coupling agents as known in the art, such as silanes and/or titanates, may be successfully used in the context of the invention as is demonstrated by the use of K-162 (composition II). The ABS resin used, termed Dow 213, is characterized in that its particle size ranges from about 0.2 to about 2.5 micron with an average at nearly 1 micron and in that about 75% of the particles are smaller than 1 micron and in that its acrylonitrile content is about 14%, its butadiene content is about 8–10% the balance being styrene, and further in that its specific gravity is 1.05. Other properties characterizing Dow 213 are listed below

| | |
|---|---|
| Rockwell hardness, R scale | 110 |
| Izod impact, notched ft. lb/in ⅛" | 2.9 |
| ¼" | 2.1 |
| Heat distortion temp. at 264 psi, °C. | 78 |
| Tensile yield, psi | 5100 |
| Tensile ultimate strength, psi | 4800 |
| Elongation, % yield, | 5 |
| ultimate | 5.5 |
| Flexural strength, psi | 8400 |
| Flexural modulus, psi × $10^{-5}$ | 3.4 |

In the Examples, the ratio of Merlon M-50 to the ABS was 55/45% by weight.

As is clearly demonstrated by the results of Tables 1 and 2, the compositions in accordance with the practice of the invention combine good mechanical properties, effective EMI shielding and good processability. The advantages of these compositions over their counterparts where ABS resins prepared by the emulsion polymerization are clearly evident upon the comparative values of spiral flow and EMI shielding.

TABLE 1

| | | I[2] | | II[3] | |
|---|---|---|---|---|---|
| Melt temperature | Control[1] | 500° F. | 525° F. | 500° F. | 525° F. |
| Tensile strength, psi × $10^3$ | 4.30 | 4.00 | 4.64 | 4.40 | 4.54 |
| Flexural strength, psi × $10^3$ | 8.60 | 9.86 | 10.30 | 10.15 | 10.15 |
| Flexural modulus, psi × $10^5$ | 3.70 | 7.61 | 8.30 | 7.85 | 7.77 |
| Impact strength, notched | | | | | |
| Izod, ft.lb/in. ⅛" | 1.8 | 1.9 | 2.0 | 1.9 | 1.8 |
| ¼" | 2.0 | 1.9 | 1.8 | 1.9 | 1.8 |
| Unnotched, ft./lb/in. | | | | | |
| ⅛" | 3.1 | 3.0 | 2.7 | 2.9 | 2.7 |
| ¼" | 4.0 | 2.6 | 3.2 | 2.8 | 2.9 |
| Compression strength psi × $10^3$ | | 12.4 | — | 12.7 | — |
| Hardness, M scale | | 60 | — | 56 | — |
| Heat deflection temperature, | | | | | |
| °F. at 264 psi | 235 | 222.8 | 225.0 | 223 | 221 |
| at 66 psi | 225 | 233.6 | 230.0 | 232 | 235 |
| Vicat softening temp. (B), °F. | | 280 | — | 277 | — |
| dc Resistivity, ohm-CH | 0.5 | 0.000 | — | 0.000 | — |
| Spiral flow (0.100 wall thickness), inches | 8 | 12 | 14 | 13 | 15 |

[1]the composition based on emulsion polymerization ABS
[2]aluminum flakes K-102HE
[3]aluminum flakes K-162

TABLE 2

| | Shielding (Transmission line) Attenuation (dB) | | |
|---|---|---|---|
| Frequency MHz | Control[1] | I[2] | II[3] |
| 0.5 | 40 | 63 | 56 |
| 1.5 | 41 | 63 | 55 |
| 5 | 41 | 63 | 54 |
| 15 | 40 | 60 | 54 |
| 50 | 40 | 59 | 54 |
| 250 | 36 | 48 | 41 |
| 500 | — | 45 | 40 |

TABLE 2-continued

| Frequency MHz | Shielding (Transmission line) Attenuation (dB) | | |
|---|---|---|---|
| | Control[1] | I[2] | II[3] |
| 960 | — | 42 | 39 |

[1] the composition based on emulsion polymerization ABS
[2] aluminum flakes K-102HE
[3] aluminum flakes K-162

What is claimed is:

1. A thermoplastic molding composition comprising
   (i) conductive particles, in the form of flakes selected from the group consisting of metals, metal oxides and metal alloys, characterized in that their resistivity, in micro-ohms-centimeter at 20° C., is below 15 and in that their largest dimension does not exceed 0.250 inches and
   (ii) a resinous blend of a polycarbonate resin and an ABS resin prepared by either bulk or mass suspension polymerization having a particle size distribution ranging from about 0.2 to about 10 microns said blend being characterized in that the weight of said polycarbonate relates to that of said ABS at from about 30/70 to about 70/30,
   said conductive particles being present in an amount of at least 8% relative to the volume of said (i) plus said (ii).

2. The composition of claim 1 wherein said conductive particles are present in an amount of between about 8 to about 25% relative to the total volume of said blend and said conductive particles.

3. The composition of claim 1 wherein said conductive particles are aluminum flakes.

4. The composition of claim 3 wherein said flakes are treated with a coupling agent.

* * * * *